Patented Aug. 11, 1953

2,648,532

UNITED STATES PATENT OFFICE 2,648,532

HEATING APPARATUS FOR PROCESSING FINE-GRANULAR MATERIAL

Franz Müller, Refrath, and Leonhard H. Winners, Koln-Kalk, Germany, assignors to Klockner-Humboldt-Deutz Aktiengesellschaft, Koln, Germany, a German corporation Application October 15, 1952, Serial No. 314,862
In Germany October 20, 1951

5 Claims. (Cl. 263—32)

Our invention relates to apparatus for heating pulverulent or granular material, for instance cement raw material, by hot gases such as the waste gases from a furnace or kiln.

It is known to heat cement raw material in the dry state by hot waste gases from a kiln or furnace.

Relating to apparatus of this general type it is an object of our invention to improve the heat transfer from the hot gases to the dry cement powder so as to secure a better economy of operation as well as a shortened heating period.

Another, more specific object of our invention is to provide a series arrangement of heat exchangers of the centrifugal dust-separator type which are sequentially traversed by the material to be heated and which afford a simple but reliable seal between the gas conduit and the passages for the pulverulent material so that the gas is safely prevented from entering into these passages.

A further object of our invention is to permit any coarse inclusions possibly present in the pulverulent cement material to pass through the gas seals without clogging the normal flow of material and without appreciably disturbing the desired gas-sealing operation.

In accordance with our invention, the heating apparatus comprises a substantially vertical arrangement of cyclone-type dust separators of which each lower one has its upwardly directed gas-outlet conduit joined with the tangential gas inlet of the next higher separator so as to form an ascending gas path serially through the separators; and the dust discharge pipe, extending from each higher separator downwardly into the gas outlet conduit of a lower separator to form a descending counter-flow path for material to be heated, is interrupted so as to form an upper portion and a lower portion vertically spaced from each other. The upper portion of the discharge pipe has a bevelled or pointed end whose slanted opening is covered by a pendulous lid weight-biased to closed position. The lid is disposed within a housing that surrounds the space between the two portions of the dust discharge pipe and has a bottom opening joined with the lower portion of the pipe.

More specific objects and features of our invention will be apparent from the following in conjunction with the description of the embodiments exemplified on the drawings in which.

Figure 1:
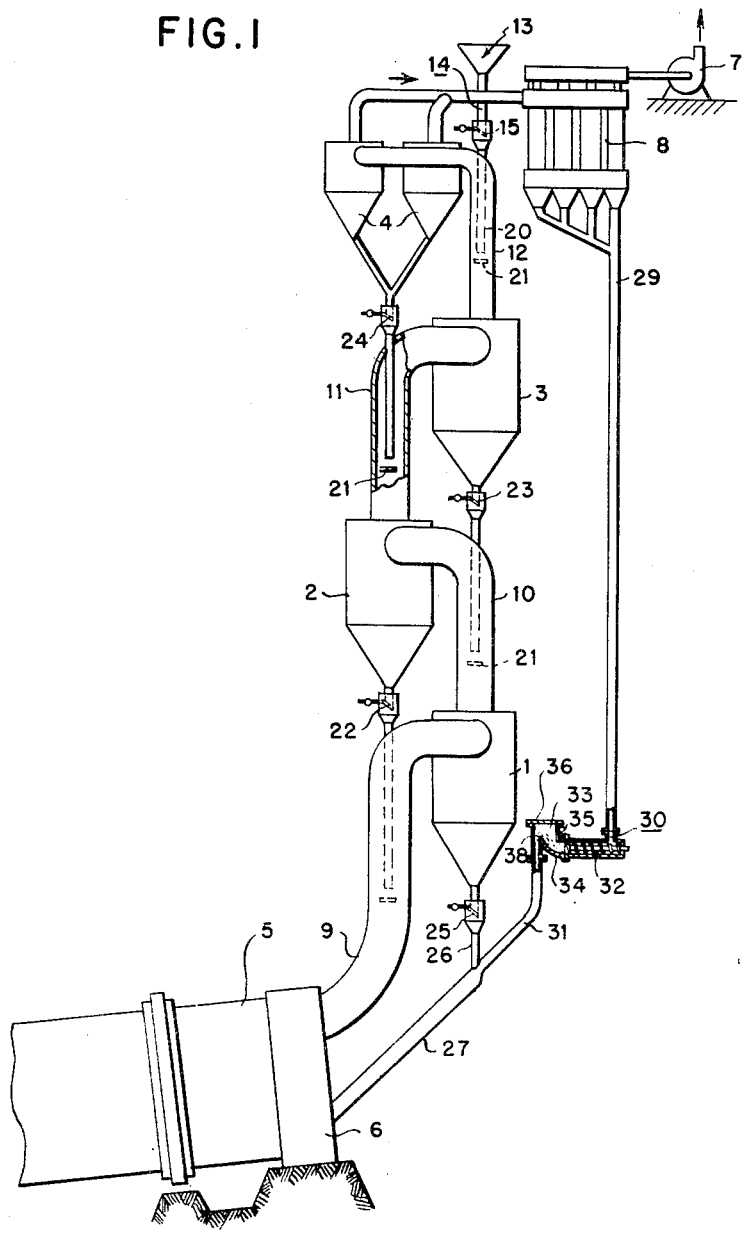
Fig. 1 shows a complete apparatus for preheating cement raw material by waste gases drawn from a kiln in which the material is to be burned.

The apparatus illustrated in Fig. 1 comprises a group of heat exchangers 1, 2, 3 and 4 connected to a rotary kiln 5. Each exchanger consists of a rotary-gas-flow separator (cyclone) to which the gas is supplied tangentially and, hence, is caused to rotate in the separator vessel before leaving the vessel through the gas outlet conduit. For better dust separation, the cyclone 4 is composed of two parallel-connected individual cyclone units each of a smaller cross section and volume than the other cyclones. The cyclone 1 is connected through a gas conduit 9 with the stationary hood 6 of the kiln. The hot gases from the kiln pass through conduit 9 into cyclone 1 and thence successively through cyclones 2, 3, and 4. The gases are exhausted by a blower 7 through a dust separating device 8 disposed at the end of the gas flow path. The device 8 comprises several cyclone units of correspondingly smaller diameters. The gas outlet conduit 9 of the kiln extends first upwardly and then about horizontally to merge with the tangential gas inlet of cyclone 1. The respective gas outlet conduits 10, 11 and 12 of cyclones 1, 2, and 3 extend similarly from each lower cyclone to the gas inlet of the next upper cyclone so that the cyclones together form a continuous ascending path for the gas flow.

Figure 5:
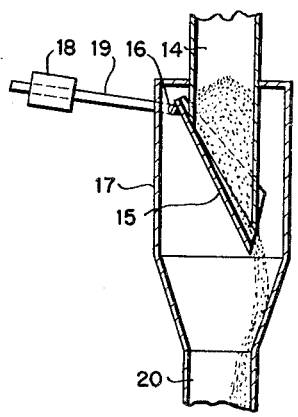
Fig. 5 is a cross sectional view of the device illustrated in Fig. 3 but shows the pertaining weight-biased lid in its operating position.

The cement raw material is supplied through a hopper 13 whence it passes through a supply pipe 14 into the gas conduit 12 leading from cyclone 3 to cyclone 4. The supply pipe 14 extends axially within the vertical portion of gas conduit 12. Above its junction with conduit 12, the pipe 14 is interrupted to form an upper portion adjoining the hopper 13 and a lower portion 20 entering into conduit 12. The two pipe portions are vertically spaced from each other. The end of the upper portion is bevelled or pointed to form a slanted opening. As apparent from Fig. 2 a pendulous lid 15 covers the slanted opening and, in the illustrated position, lies flat against the bevelled end face of the upper portion of pipe 14. Lid 15 is secured to a shaft revolvably journalled in the walls of a housing 17 which encloses the space between the upper and lower pipe portions. The lower portion 20 is joined with the bottom opening of housing 17. Lid 15 is biased in the closing sense by a weight 18 displaceably mounted on an arm 19. Arm 19 is attached to the shaft 16 at the outside of housing 17. During the operation of the apparatus, the lid 15 is slightly open as illustrated in Fig. 5, so that a flow of material may continuously escape over the lower edge of lid 15 in a quantity corresponding to the amount of material supplied from the hopper 13. The weight 18 is dimensioned so that an accumulation of material up to a certain height is maintained above the lid. The height of this accumulation may be regulated by displacing weight 18 on arm 19. The continuous flow of material is thus stemmed up on the pendulous lid thus providing a gas seal in a simple and effective manner. Such a gas seal is necessary because the pressure in portion 20 of the pipe is lower than in the upper portion. Upon cessation of the supply of material into the hopper 13, the stemmed up accumulation of material discharges, and the lid 15 closes automatically so that the pressure difference between the two portions of the pipe remains maintained. The lid has also the advantage that it may open a larger amount when impinged upon by coarse foreign inclusions in the material, thus readily permitting the passage of such inclusions.

Figure 2:
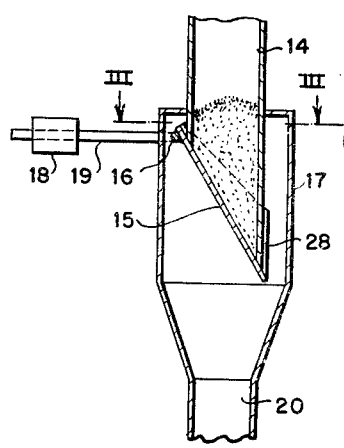
Fig. 2 is a vertical cross section, on a larger scale, of one of the dust-discharge control devices pertaining to the apparatus of Fig. 1.
Figure 3:
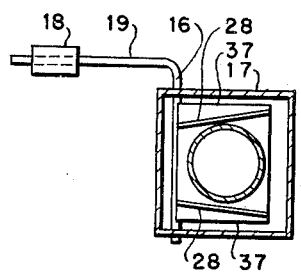
Fig. 3 is a horizontal cross section of the same device, the section being taken along the plane III—III in Fig. 2.

The pendulous lid 15 has two ribs 28 (Figs. 2, 3). The ribs extend from the hinge shaft 16 to the lower edge of the lid and jointly straddle the slanted end of the upper portion of pipe 14. The two ribs have oblique positions relative to the hinge shaft so that their mutual spacing widens toward the lower edge of the lid. The height of the ribs is such that their upper edges, in the open position of the lid, lie still above the edges of the slanted opening. Thus designed, the ribs prevent the material from spreading on the lid 15 thus improving the desired gas seal. Any foreign bodies falling through the opening are immediately guided downwardly by the ribs and hence cannot become lodged between the lateral edges 37 of the lid and the adjacent wall of the housing 17.

Downwardly spaced from the lower end of pipe portion 20 is a circular baffle plate 21 (Fig. 1). The plate secures a uniform distribution of the material. The material, dropping through the pipe portion 20 onto the baffle plate, flows in a thin veil over the rim of the plate into the ascending hot gas current thus securing an effective heating of the granular material. The distance of the baffle plate from the end of pipe portion 20 is sufficiently large to prevent at this point the occurrence of a gas seal by the flow of material.

The dust material separated in cyclones 2, 3, and 4 passes over pendulous and weight-biased lids 22, 23 and 24 into the respective gas outlet conduits 9, 10 and 11 (Fig. 1). Another lid 25 is provided in the dust discharge passage of cyclone 1. The lids 22 to 25 are similar to lid 15, each forming part of a device designed and operative as described with reference to Figs. 2, 3 and 5. The material passing from cyclone 1 over lid 25 drops through a pipe 26 into a supply pipe 27 which slants downwardly into the rotary kiln.

The material separated from the gas flow in the final dust separating device 8 passes through a pipe 29 into a pressure lock 30 from which it reaches the kiln through a connecting pipe 31 joined with the above-mentioned pipe 27. The pressure lock 30, has a conveyor screw 32 which passes the material from pipe 29 into a trap chamber 33. Chamber 33 is bordered by a curved wall portion 34 of a box 35 and closed by a removable cover 36. The material conveyed by the screw 32 is trapped at the curved wall portion 34 and continuously overflows from the trap into the connecting pipe 31. The trap thus forms a gas seal between pipes 29 and 31 which prevents an equilization of the pressure difference existing between them. The trap seal also protects the mechanical parts of the screw 32 from the high temperature of pipes 27 and 31.

Figure 4:
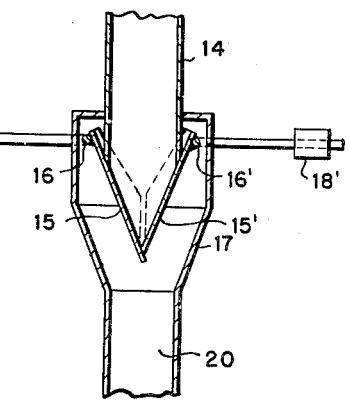
Fig. 4 shows, in section, a modified dust-discharge control device applicable in apparatus according to Fig. 1.

In the embodiment shown in Fig. 4, two pendulous lids 15 and 15' are provided, each mounted, as described above, on a hinge shaft 16 or 16' loaded by a displaceable weight 18 or 18'. This embodiment has the advantage of requiring a smaller height for otherwise similar requirements.

For the processing of sticky material, the lids are preferably subjected to oscillations by a suitable vibrator in order to prevent the material from baking to the lids. This may be done, for instance, by attaching an electromagnetic oscillation generator to the hinge shaft of the lid or to the outside of the housing at a place near the shaft.

It will be apparent that the invention is suitable not only for the heating of cement raw material but also for heating or drying other pulverulent or finely divided substances; and it will be obvious to those skilled in the art, upon a study of this disclosure, that apparatus according to the invention may be modified and embodied in designs other than those specifically described, without departing from the essence of the invention and within the scope of the claims annexed hereto.

We claim:

1. Apparatus for heating fine-granular material, such as cement raw material, by waste gases, comprising a series of cyclone-type dust separators disposed at different respective heights, each separator having a tangential gas inlet and an upwardly directed gas outlet conduit and a downwardly extending dust discharge pipe, each lower separator having its gas outlet conduit joined with the gas inlet of an upper separator to form a continuous ascending gas path, blower means joined with said path for forcing gas upwardly through said series of separators, each upper separator having its dust discharge pipe terminate within the gas outlet conduit of a lower separator to form a descending path for material, each of said dust discharge pipes having an upper portion and a lower portion vertically spaced from each other, a housing enclosing the space between said two portions and having a bottom opening joined with said lower portion, said upper portion having a slanted opening at its lower end within said housing, a pendulous lid disposed in said housing for closing said opening and hinged near the upper edge portion of said slanted opening, and a loading weight joined with said lid for biasing said lid toward closed position.

2. Apparatus for heating granular material, comprising a feed hopper for supplying the material, said hopper having a dust discharge pipe, a series of cyclone dust separators sequentially arranged below said hopper, each separator having a tangential gas inlet and an upwardly directed gas outlet conduit and a downwardly extending dust discharge pipe, each lower separator having its gas outlet conduit joined with the gas inlet of an upper separator to form a continuous ascending gas path, blower means joined with said path for forcing gas upwardly through said series of separators, each upper separator having its dust discharge pipe terminate within the gas outlet conduit of a lower separator to form a descending path for material, said dust discharge pipe of said feed hopper extending downwardly into the gas outlet conduit of the uppermost separator of said series, each of said dust discharge pipes having an upper portion and a lower portion vertically spaced from each other, a housing enclosing the space between said two portions and having a bottom opening joined with said lower portion, said upper portion having a slanted opening at its lower end within said housing, a pendulous lid disposed in said housing for closing said opening and hinged near the upper edge portion of said slanted opening, and a loading weight joined with said lid for biasing said lid toward closed position.

3. In apparatus according to claim 1, said lid having two upwardly projecting ribs extending from the top edge to the lower edge of said lid at both sides respectively of said upper portion.

4. Apparatus for heating fine-granular material, such as cement raw material, by waste gases, comprising a series of cyclone-type dust separators disposed at different respective heights, each separator having a tangential gas inlet and an upwardly directed gas outlet conduit and a downwardly extending dust discharge pipe, each lower separator having its gas outlet conduit joined with the gas inlet of an upper separator to form a continuous ascending gas path, blower means joined with said path for forcing gas upwardly through said series of separators, each upper separator having its dust discharge pipe terminate within the gas outlet conduit of a lower separator to form a descending path for material, each of said dust discharge pipes having an upper portion and a lower portion vertically spaced from each other, a housing enclosing the space between said two portions and having a bottom opening joined with said lower portion, said upper portion having a pointed lower end in said housing and forming two slanted openings in respective planes inclined toward each other, two pendulous lids disposed opposite each other within said housing for closing said respective openings, each lid being hinged near the upper edge portion of the pertaining slanted opening, and respective loading weights joined with said lids for biasing each lid toward closed position.

5. Apparatus according to claim 1, comprising a hinge shaft journalled on said housing and extending from the outside into said housing, said lid being mounted on said hinge shaft, an arm mounted on said hinge shaft outside said housing, said loading weight being displaceably mounted on said arm for adjusting the height of the material accumulating upon said lid during the operation of the apparatus.

FRANZ MÜLLER.
LEONHARD H. WINNERS.

References Cited in the file of this patent

UNITED STATES PATENTS

| Number | Name | Date |
|---|---|---|
| 729,009 | Sutton et al. | May 26, 1903 |
| 1,459,326 | Dow | June 19, 1923 |
| 2,077,346 | Voskamp | Apr. 13, 1937 |